Nov. 28, 1944.  R. F. SMITH  2,363,755
BALL AND SOCKET TRAILER HITCH
Filed Sept. 27, 1943
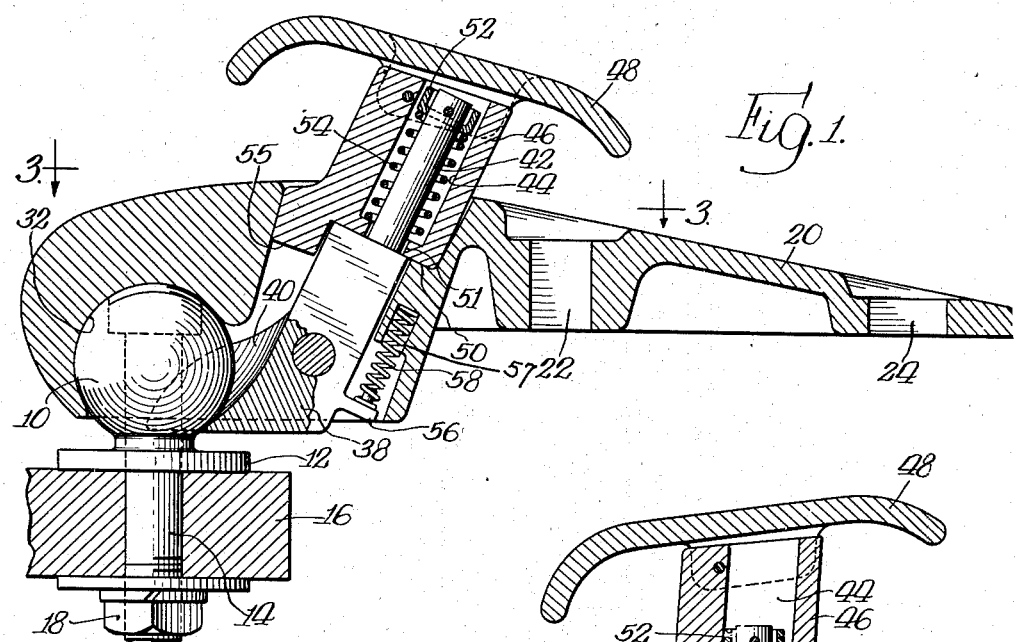
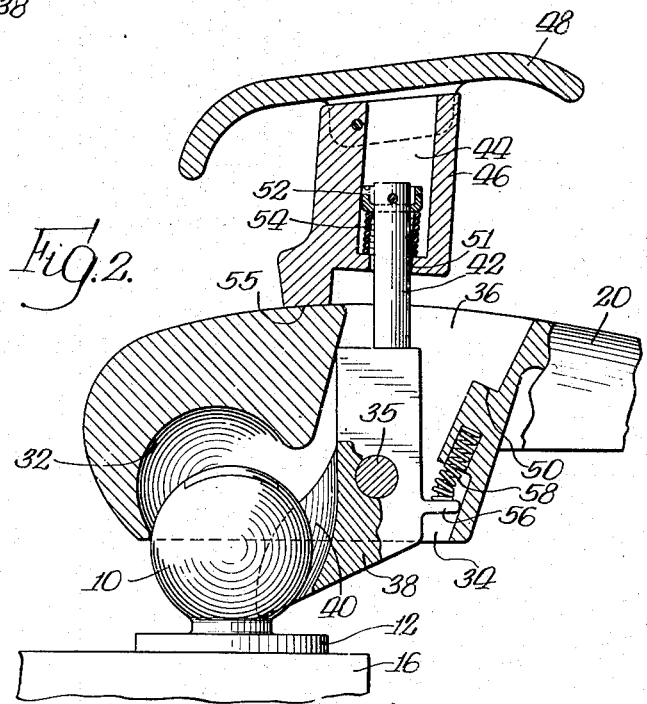
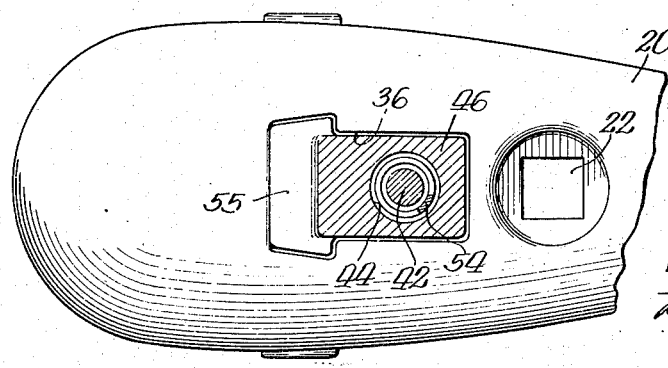
INVENTOR.
Ray F. Smith,
BY
Bair & Freeman
Atty's Patented Nov. 28, 1944

2,363,755

UNITED STATES PATENT OFFICE 2,363,755

BALL-AND-SOCKET TRAILER HITCH

Ray F. Smith, Des Moines, Iowa, assignor to Ideal Manufacturing Co., Des Moines, Iowa, a corporation of Iowa Application September 27, 1943, Serial No. 503,905

7 Claims. (Cl. 280—33.17)

My invention relates to trailer hitches of the type in which one member has a ball and another member has a socket to receive the ball, the members being adapted to be attached, respectively, to towing and towed vehicles.

It is the purpose of my invention to provide in such a ball and socket trailer hitch a novel and simple means for locking the ball in the socket and releasing the ball.

In my invention a ball-engaging element is pivoted in a recess in the member which has the socket, to have movement toward and from ball-holding position. It is moved to and from such position by means of a locking element which can be moved into and out of a bore which communicates with said recess or may be part of it, and then moved to effect the operation of the ball engaging element. The locking element has a bore receiving a stem on the ball, so that the locking element may move with relation to the ball engaging element and movement of the locking element serves to operate the ball-engaging element. The ball-engaging element and the locking element afford ball locking and releasing mechanism.

With these and other objects in view, my invention consists in the construction, arrangement and combination of the various parts of my apparatus, whereby the objects contemplated are attained, as hereinafter more fully set forth, pointed out in my claims, and illustrated in the accompanying drawing, in which:

Figure 1 is a vertical sectional view of my trailer hitch, in ball locking position, parts being shown in elevation.

Figure 2 is a side elevation of the hitch illustrating the ball-locking mechanism, in ball-releasing position, parts being shown in section, and Figure 3 is a detailed horizontal, sectional view, taken on the line 3—3 of Figure 1.

My improved trailer hitch illustrated in the drawing herewith has a ball member 10 with a base 12. From the ball 10 extends a neck 14 which may be a bolt extended through the ball 12. The stem 14 extends through a draft bar or the like 16, by which the member 10 is connected with a towed vehicle, for instance. On the stem 14 is a nut 18.

My hitch includes also the member 20, which may be a casting, and has bolt holes 22—24, to receive bolts 26 for fastening the member 20 to a draft member of a towing vehicle, for example, such as a truck or trailer.

A forward portion of the member 20 is provided on its underside with a socket 32 to receive the ball. The socket 32 opens into a suitable recess 34, which has a bore portion 36 extending to the top of the member 20.

A movable ball-engaging element 38 is shown as pivoted to the member 20 in the recess 34 by a cross pin 35. It may be mounted in any suitable way to permit it to serve its function of engaging and releasing the ball. This ball-engaging element 38 has a concave face 40 which may be moved to position to engage the ball 12 and to form part of a socket. The element 38 also has a stem 42 projecting into a bore 44 in a locking element 46 fitting in the upper end of the bore 36. The upper part of the locking element 46 projects above the member 20 and has a detachable non-rotatable handle 48, adapted to be grasped for manual manipulation. The lower part of the locking element 46 fits into the upper end of the bore 36 in the member 20. The bore 36 has a shoulder to limit the downward movement of the element 46 therein. The cross section of the lower part of the element 46 corresponds to that of the upper part of the bore 36, and the shapes of these respective parts are such that the handle member 48 cannot turn when the member 46 is received in the bore 36, but may be pulled up to lift the member 46 out of the bore 36, and let it slip back into the bore 36 where it will again be snugly and non-rotatably held.

The diameter of the bore 44 in the locking element 46 is reduced at its lower end at 51 to snugly receive and permit rotation and sliding of the locking element on the stem 42. On the upper end of the stem 42 is a detachable cap 52. Held between the cap 52 and the shoulder formed at the upper end of the reduced bore 50 is a coil spring 54, which tends to hold the locking element 46 snugly in the bore 34.

The element 46 can however be pulled out of the bore 34 against the tension of the spring 54 far enough to permit it to swing forward as shown in Figure 2, and release the ball engaging element 38 from ball holding position.

The parts are so shaped that when the locking element 46 projects into the bore 36, the movable ball-engaging element 38 will be held in ball-engaging position as shown in Figure 1. When the locking element 46 is then pulled out of the socket formed by the bore 36 and swung forwardly, the member 38 will be moved and held in ball-releasing position, as shown in Figure 2.

In practical operation, the element 46 is adjusted to the position of Figure 2 for holding the element 38 in ball-releasing position. The member 46 can rotate on the stem 42 and may be rotated enough so that it cannot accidentally slip back into the bore 36. The ball 10 is inserted into the socket 32, whereupon the locking element 46 is allowed to slip back into the bore. The effect is to swing the ball-engaging element 38 to socket-forming and ball-holding position and to lock it firmly.

It will be noted that the locking element 46 is formed with a downturned flange 55 which overlaps the upper end of the ball-engaging element 38 when the member 46 is in its lowermost position. The flange 55 then forms a filler between the element 38 and the wall of the bore 36 for giving the structure sturdiness.

I have thus provided a very simple, cheap and efficient arrangement for controlling the movable ball-engaging element. The locking element 46 is merely pulled out against the tension of the spring 54, and swung to clear the upper end of the bore 34. The effect is to move the ball-holding element 38 from ball-holding position of Figure 1 to ball-releasing position of Figure 2. The spring 54 holds the locking element 46 snugly in the bore 34, whereby the ball-holding member 38 is locked in whichever position it has taken, and there is no danger of actual displacement.

To prevent rattle and to hold the parts snugly, I may provide on the element 38 a foot 56 and form in the member 20 a pocket 57 communicating with the recess 34. In the pocket 57 is a coil spring 58 bearing against the foot 56.

It is obvious that change may be made in the details of the structure of the hitch here described, and it is my purpose to cover by my claims any changes or modifications which may come within the scope of my invention.

I claim as my invention:

1. In a hitch, a ball, a member having a socket, a communicating recess to receive the ball and having a bore communicating with the recess, a ball-engaging element pivoted in the recess to move to and from ball-engaging position, and having a stem, a locking element receivable in the bore, said bore and locking element being so shaped that the locking element may be received and held against rotation in the bore and may be removed from the bore and then moved, for actuating the ball engaging member, said locking element having a bore for slidably and rotatably associating the locking element with the stem.

2. In a hitch, a ball, a member having a socket, a communicating recess to receive the ball and having a bore communicating with the recess, a ball-engaging element pivoted in the recess to move to and from ball-engaging position, and having a stem, a locking element receivable in the bore, said bore and locking element being so shaped that the locking element may be received in the bore and may be removed therefrom and moved to actuate said ball engaging element, said locking element having slidable and rotatable association with the stem, and means tending to hold the locking member yieldingly in the bore.

3. In a hitch, a ball, a member having a socket, a communicating recess to receive the ball and having a bore communicating with the recess, a ball-engaging element pivoted in the recess to move to and from ball-engaging position, and having a stem, a locking element receivable in the bore, said bore and locking element being so shaped that the locking element may be received in the bore and may be removed therefrom and moved to actuate said ball engaging element, said locking element having slidable and rotatable association with the stem, and means tending to hold the locking member yieldingly in the bore, said locking element having a part adapted to overlap the upper part of the ball engaging element when the parts are in ball-locking position to take strain imposed by the ball on the ball engaging member.

4. In a hitch, a ball, a member having a socket, a communicating recess to receive the ball and having a bore communicating with the recess, a ball-engaging element pivoted in the recess to move to and from ball-engaging position, and having a stem, a locking element receivable in the bore, said bore and locking element being so shaped that the locking element may be received in the bore and may be removed therefrom and moved to actuate said ball engaging element, said locking element having slidable and rotatable association with the stem, and means tending to hold the locking member yieldingly in the bore, said locking element having a part adapted to overlap the upper part of the ball engaging element when the parts are in ball locking position to take strain imposed by the ball on the ball engaging member, and an anti-rattle spring interposed between the ball engaging member and the first named member.

5. In a hitch, a ball, a member having a socket, a communicating recess to receive the ball and having a bore communicating with the recess, a ball-engaging element pivoted in the recess to move to and from ball-engaging position, and having a stem, a locking element receivable in the bore, said bore and locking element being so shaped that the locking element may be received in the bore and may be removed therefrom and moved to actuate said ball engaging element, said locking element having slidable and rotatable association with the stem, and means tending to hold the locking member yieldingly in the bore, said means comprising a spring on said stem and bearing against the locking member.

6. In a hitch, a ball, a member having a socket, a communicating recess to receive the ball and having a bore communicating with the recess, a ball-engaging element pivoted in the recess to move to and from ball-engaging position, and having a stem, a locking element receivable in the bore, said bore and locking element being so shaped that the locking element may be received in the bore and may be removed therefrom and moved to actuate said ball-engaging element, said locking element having a bore to slidably receive said stem, a cap on the stem, a spring on the stem held between the cap and the locking element for yieldingly tending to pull the locking element into the bore in the first-named member.

7. In a hitch, a ball, a member having a socket, a communicating recess to receive the ball and having a bore communicating with the recess, a ball-engaging element pivoted in the recess to move to and from ball-engaging position, and having a stem, a locking element receivable in the bore, said bore and locking element being so shaped that the locking element may be received in the bore and may be removed therefrom and moved to actuate said ball-engaging element, said locking element having a bore to slidably receive said stem, a cap on the stem, a spring on the stem held between the cap and the locking element for yieldingly tending to pull the locking element into the bore in the first-named member, said locking element having a handle which is detachable to afford access to the bore in the locking element.

RAY F. SMITH.